United States Patent [19]

Weyand, Jr.

[11] Patent Number: 4,813,319

[45] Date of Patent: Mar. 21, 1989

[54] METHOD AND APPARATUS FOR TRANSVERSELY CUTTING STRIPS OF DEFORMABLE MATERIAL

[75] Inventor: Harley P. Weyand, Jr., Doylestown, Ohio

[73] Assignee: The Firestone Tire & Rubber Company, Akron, Ohio

[21] Appl. No.: 33,294

[22] Filed: Apr. 1, 1987

[51] Int. Cl.⁴ .......................... B26D 1/18; B26D 7/08
[52] U.S. Cl. ........................................... 83/22; 83/56;
83/168; 83/169; 83/451; 83/484; 83/488;
83/581; 83/676
[58] Field of Search ................. 83/168, 169, 171, 215,
83/282, 484, 486.1, 488, 81, 82, 129, 374, 375,
451, 452, 22, 23, 56, 614, 631, 676, 155, 581

[56] References Cited

U.S. PATENT DOCUMENTS

| | | | |
|---|---|---|---|
| 1,629,830 | 5/1927 | Lyons | 83/872 |
| 1,888,754 | 11/1932 | Alexander et al. | 83/488 |
| 1,958,912 | 5/1934 | Clark | 83/169 |
| 2,696,884 | 12/1954 | Mishler et al. | 83/169 |
| 3,608,412 | 9/1971 | Braden et al. | 83/169 |
| 3,762,259 | 10/1973 | Kuts | 83/488 |
| 3,808,922 | 5/1974 | Ohlhoff | 83/168 |
| 4,357,006 | 11/1982 | Hayes | 83/451 |
| 4,516,451 | 5/1985 | Takeshita et al. | 83/171 |
| 4,572,046 | 2/1986 | Still et al. | 83/614 |

Primary Examiner—E. R. Kazenske
Assistant Examiner—Hien H. Phan
Attorney, Agent, or Firm—Ernst H. Ruf

[57] ABSTRACT

An apparatus and improved method for transversely cutting strips of deformable material with a rotating cutting blade which is moved generally transversely across the strip at a predetermined rake angle and bevel angle. A vacuum applied to certain chambers of a platen draws the strip firmly against a supporting structure at two locations on opposite sides of a cutting line during the cut cycle. A lubricant is sprayed through nozzles onto the blade as it cuts the strip and blow-off nozzles remove excess lubricant during the cut and return cycles of the blade to prevent contamination of the cut strip edges. A release bar assists in disengaging the strip from the platen after the strip is cut. Grippers remove the cut strip and then an input conveyor advances the remaining strip toward the cutting line where the grippers pull the strip forward to a predetermined position for the next cut cycle. The design of the cutting blade and its speed of rotation and transverse movement across the strip in combination with the lubrication of the blade and removal of excess lubricant provide cut strip ends relatively free of contamination for subsequent joining on a drum as in a tire building process.

41 Claims, 6 Drawing Sheets

METHOD AND APPARATUS FOR TRANSVERSELY CUTTING STRIPS OF DEFORMABLE MATERIAL

TECHNICAL FIELD

The present invention relates to an apparatus for transversely cutting strips of deformable material and in particular cutting strips of elastomeric material used in the manufacture of tires, and to a method of cutting such strips. More particularly, the invention relates to an improved apparatus and method which provides a satisfactory bevel on the cut strip ends with reduced contamination thereof to permit the ends to be joined subsequently on a drum in a tire building process.

BACKGROUND ART

In the tire manufacturing industry, certain tire parts are formed starting from continuous strip of elastomeric material. Transverse cuts are made in the strips either by hand or by means of a power driven blade inclined in relation to the surface supporting the uncut strip. Successive strips are cut off the ends of a continuous strip of a particular material for subsequent joining on a drum in a tire building process. The hand cuts usually result in a non-uniform cut difficult to satisfactorily join in a splice and is time consuming.

During each cutting operation the power driven blade induces relatively severe cutting stress in the strip on account of the inclined position of the blade in relation to the strip surface. At normal output rates, the stress, which depends somewhat on the type of blade, cutting speed, and type of material being cut, is usually severe enough to deform the strip by wrinkling the strip at the cutting line, generally immediately upstream from the blade. Such wrinkling of the strip results in inaccurate and undulated cuts. Attempts have been made to reduce these cutting stresses by the use of rotary blades. However, at the output rates permitted on current tire manufacturing machines the sole employment of rotary blades have proven insufficient for preventing local deformation and crumpling or wrinkling of the strip during cutting. Many of these deformable strips used in the building of tires are multi-components of materials increasing further the difficulty of achieving a satisfactory cut because the rubber of one component is smeared into adjacent components during the cutting of the strip.

Another problem with the cutting of such strips is that the resultant beveled edges are contaminated with the material being cut from the strip and by lubricants used with the cutting operation required to cool the cutting blade and to provide a smooth cut joint especially when the strip is comprised of several different materials.

This contamination, either resulting from the cut material or from the lubricant residue, requires subsequent cleaning and if not cleaned, results in an unsatisfactory joint or splice when the beveled ends are joined. Such contamination, if allowed, adversely affects assembly adhesion of the beveled ends and the cosmetic appearance, resulting in a substandard product. Also this need of cleaning the severed ends of the strip prior to joining adds another manufacturing operation, thereby increasing the costs of the final product produced thereby.

Heretofore strips have been cut with rotary knives to provide a better cut than a linear knife blade and have also used lubricants to cool the blade and to increase the cutting ability of the blade. Furthermore, it has been known that to reduce the crumpling or wrinkling of the strip being cut to press or retain the strip tightly against a surface adjacent the cut line by mechanical hold-down means, vacuum, or the like.

DISCLOSURE OF THE INVENTION

An objective of the invention is to provide an improved apparatus and method for transversely separating strips of deformable material, which strips may consist of multiple preassembled or preprocessed components of varying gauge and varying modulus. Another objective is to provide such an apparatus and method in which the separation is accomplished at a minimum angle to the horizontal thereby exposing maximum material for future mating of the ends of the material around a cylindrical drum wherein the beveled edges come into contact in an essentially endless configuration.

A still further objective is to provide such an apparatus and method in which the severing or formation of the beveled strips ends is accomplished without smearing or contamination thereby providing suitable adhesion between the beveled ends and a pleasing splice in the final product.

A further objective of the invention is to provide such an improved apparatus and method in which the separation of the strips by a rotating blade is accomplished within a time frame compatible within an overall time frame commensurate with required productivity requirements, and in which the separation can be accomplished with apparatus whose operation will be within acceptable reliability and maintainability standards and will allow quick change of expandable items such as the rotary cutting blade.

A still further objective of the invention is to provide such an improved apparatus and method in which when lubrication is applied to the blade, the lubricant or lubricant residue is absent from the cut ends of the material prior to forming the assembled splice, and in which sufficient lubricant can be applied to the rotating blade to maintain the desired cooling effect and that any amount of excess lubricant which would be detrimental to the material is removed during the cutting process eliminating the need of a subsequent cleaning operation for the resultant beveled ends.

Another objective is to provide such an improved apparatus and method in which the speed of the rotary blade is within a predetermined speed range and that when combined with a blade having certain design characteristics as to its diameter and thickness and number of teeth, together with a transversing speed achieves the desired contamination free beveled end; and in which this cutting action is combined with the application of a lubricant by an atomizing spray within certain pressure limits and with excess lubrication blow-off removal means achieves the desired contamination-free end.

Another objective of the invention is to provide such an improved apparatus and method in which the strip is retained in a secured pressing engagement with a supporting surface adjacent both sides of a cut line through which the rotary blade will pass, and which includes means for rapidly and efficiently disengaging the strip from the supporting surface after the cut is made to enable the cut strip to be automatically removed from the supporting structure, thus permitting a new section of strip to be advanced into position for cutting the next strip section therefrom.

These objectives and advantages are achieved by the improved apparatus of the invention, the general nature of which may be stated as including a device for transversely cutting a strip of deformable material including support means for supporting a strip of said material; transport means for moving said strip along the support means; a cutter blade movably mounted for a generally transverse movement across said strip along a cut line during a cut cycle; drive means for moving the cutter blade generally transversely across the strip in a cutting direction during the cut cycle and for moving the cutter blade in an opposite return direction during a return cycle; means for rotating the blade; hold-down means for holding the strip against the support means on opposite sides of the cut line during the cut cycle; means for applying a lubricant onto the blade generally throughout its cutting movement across said strip; and blow-off means for directing excess lubricant away from the cut line.

These objectives and advantages are further obtained by the improved method of the invention, the general nature of which may be stated as including a method for transversely cutting a strip of deformable material including the steps of transporting an elongated strip of said material along a support structure to a cutting station; firmly drawing the strip against the support structure at two spaced apart positions; moving a rotating cutter blade in a cutting direction generally transversely across the strip between the spaced positions to cut the strip along a cut line and provide a sized cut strip during a cut cycle; applying a lubricant on the blade as it is moving across the strip in the cutting direction; removing some of the lubricant after it has been applied onto the blade; releasing the cut strip and remaining elongated strip from against the support structure at both positions; and removing the sized cut strip from the support structure.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
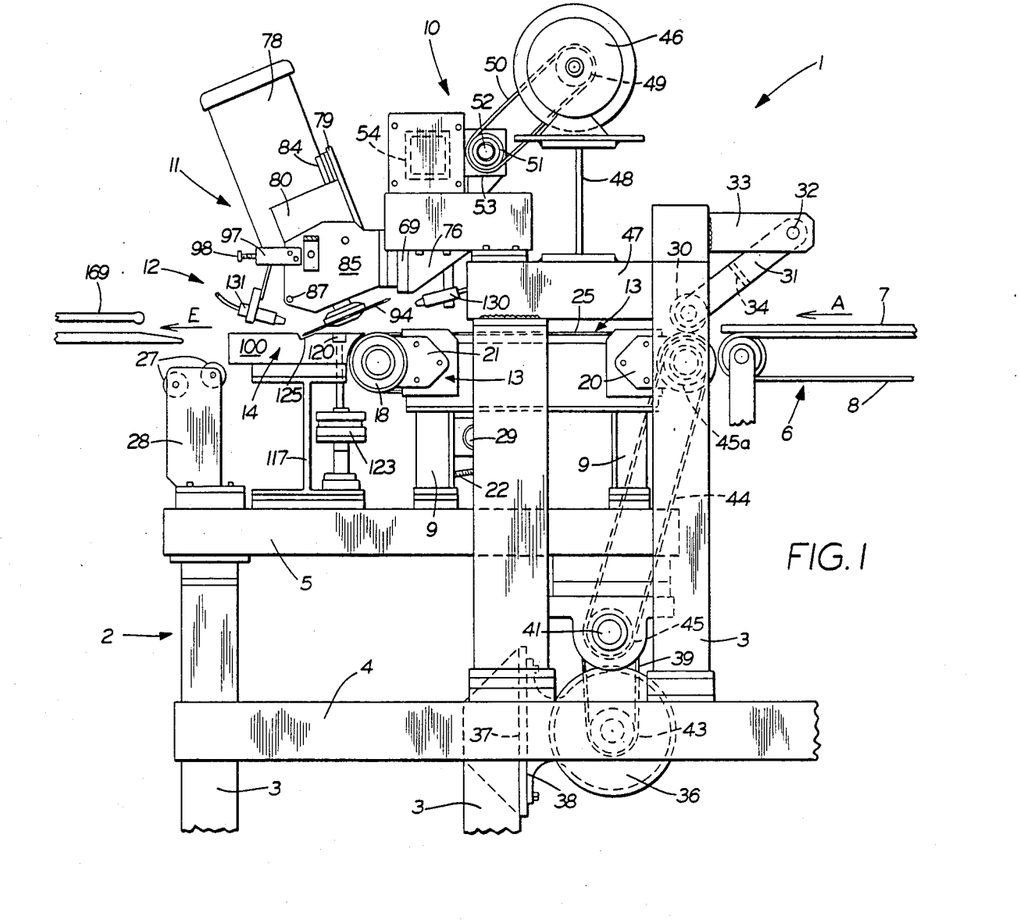
FIG. 1 is a fragmentary side elevational view of the improved apparatus of the invention for carrying out the method steps for transversely cutting the strip of deformable material.
Figure 2:
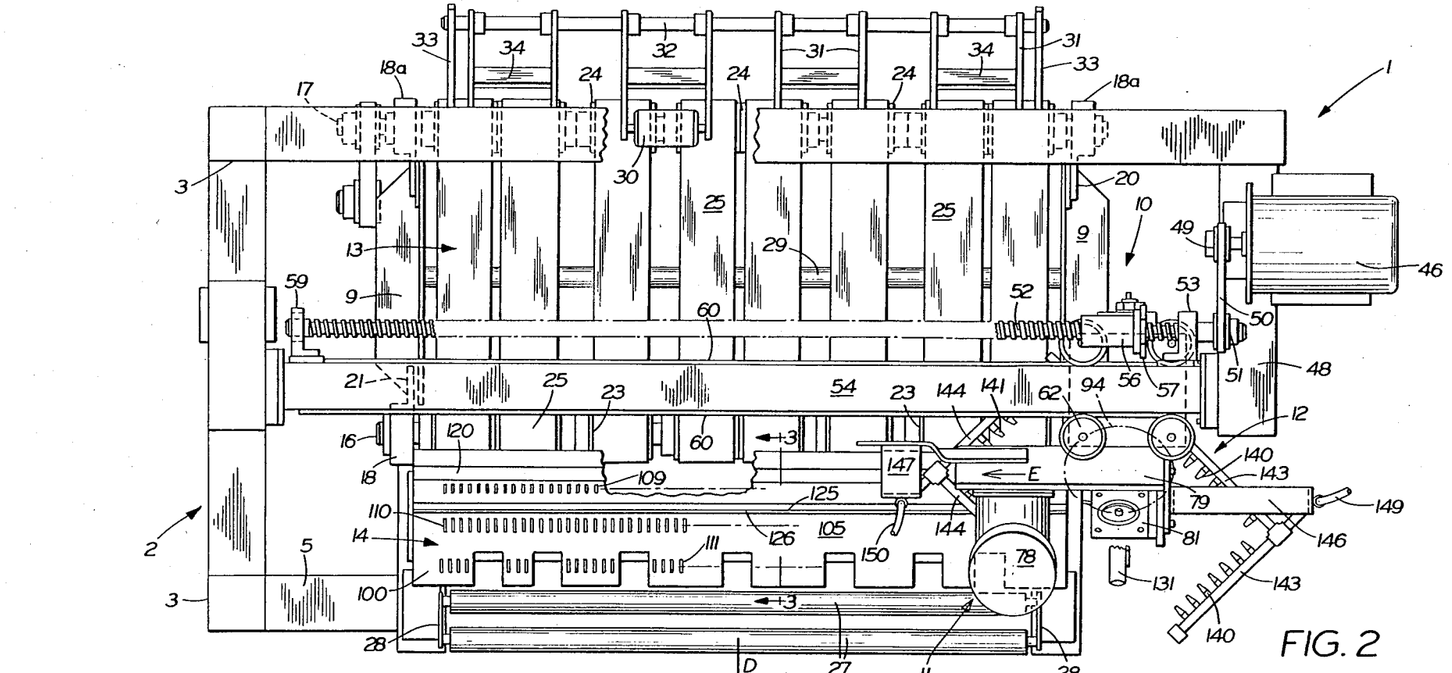
FIG. 2 is a top plan view of the apparatus of FIG. 1 with portions broken away for clarity.
Figure 4:
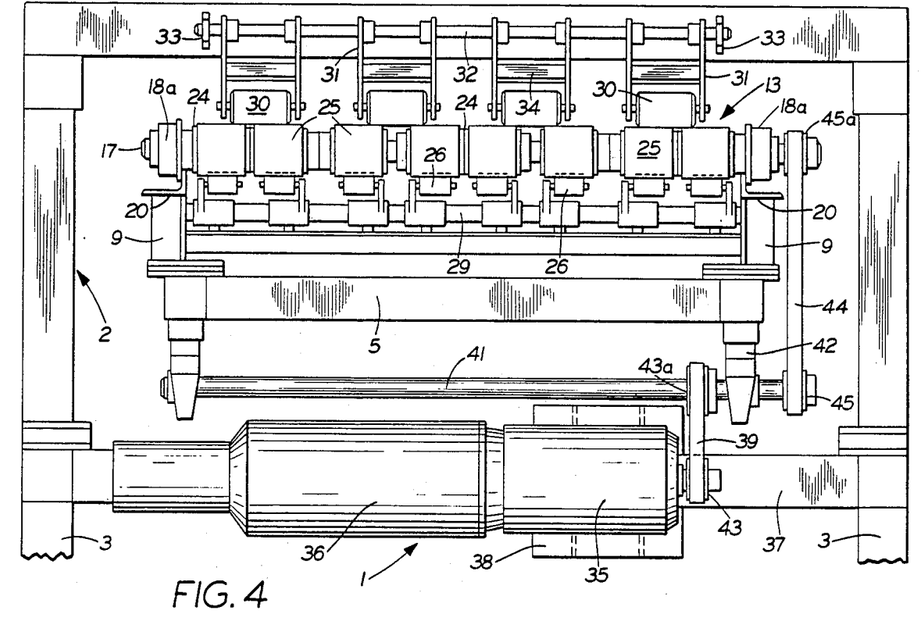
FIG. 4 is an end elevational view at the inlet end of the apparatus as shown in FIGS. 1 and 2.

The improved apparatus of the invention is indicated generally at 1, and is shown generally in FIGS. 1, 2 and 4. Referring to FIG. 1, the improved apparatus includes a main support frame indicated generally at 2, consisting of a plurality of vertical support beams 3 and inner horizontal support beams 4 and 5. An incoming conveyor 6 is shown in fragmentary form on the right hand side of apparatus 1 with a portion of a strip 7 of the deformable material mounted on a conveyor belt 8 for subsequent movement in the direction of arrow A into the incoming side of the apparatus. Apparatus 1 includes a number of assemblies indicated generally as follows, a carriage assembly 10, a cutter assembly 11 a lubricant spray assembly 12, a blow-off assembly 15 (FIG. 5), an internal conveyor assembly 13, and a hold-down platen and cutter plate assembly 14.

Conveyor assembly 13 (FIGS. 2 and 4) includes a pair of spaced conveyor shafts 16 and 17, each of which is rotatably mounted by pairs of pillow bearings 18 and 18A, respectively. Pillow bearings 18A are mounted on horizontal frame members 9 by brackets 20 (FIGS. 1 and 4) with pillow bearings 18 being mounted on frame members 9 by brackets 21. A plurality of timing belt pulleys 23 are mounted on front shaft 16 and align with a corresponding number of timing belt pulleys 24 mounted on rear conveyor shaft 17. A plurality of continuous timing belts 25 are trained about respective pairs of pulleys 23 and 24 and extend between the shafts as shown particularly in FIG. 2. A pair of rotatably mounted idler rolls 27 are mounted on brackets 28 as shown particularly in FIGS. 1, 2 and 5 at the outlet end of the apparatus to assist in removing a severed accurately sized strip of material from the apparatus.

Conveyor assembly 13 further includes a plurality of strip hold-down rolls 30 whch are rotatably mounted between the ends of individual bracket pairs 31 which are pivotally mounted on a shaft 32. Shaft 32 extends transversely across the apparatus at the entrance end thereof and is mounted by a pair of end brackets 33. Each roll mounting bracket pair 31 is reinforced by an intervening plate 34. The hold-down rolls are adapted to engage an incoming strip 7 of deformable material as can be seen in FIG. 1, to assist in maintaining the strip in position against conveyor timing belts 25 adjacent entrance belt pulleys 23.

A plurality of belt tensioning rolls 26 are mounted on a shaft 29 which extends transversely beneath the midpoint of conveyor belts 25. Rolls 26 (FIG. 4) are maintained in contact with belts 25 by an adjusting screw 22 (FIG. 1) which maintains shaft 29 in a preset belt tensioning position. Rolls 26 maintain a predetermined tensioning pressure on the belts at all times with a relatively simple adjustment mechanism.

A conveyor DC drive motor 36 is secured by a mounting pad 38 on a frame supporting channel 37 (FIGS. 1 and 2). Drive motor 36 is connected to a reducer 35. A timing belt 39 is connected to the ouput shaft of reducer 35 by a timing pulley 43 and to a second timing pulley 43A mounted on a jack shaft 41. Shaft 41 is mounted on a pair of pillow bearing 42 supported by horizontal support channel 5. A second timing belt 44 extends between a timing pulley 45 mounted on the outer end of jack shaft 41 and another pulley 45A mounted on the end of conveyor shaft 17. Thus motor 36 drives conveyor shaft 17 and correspondingly conveyor belts 25 for moving material strip 7 into the interior of apparatus 1.

Figure 7:
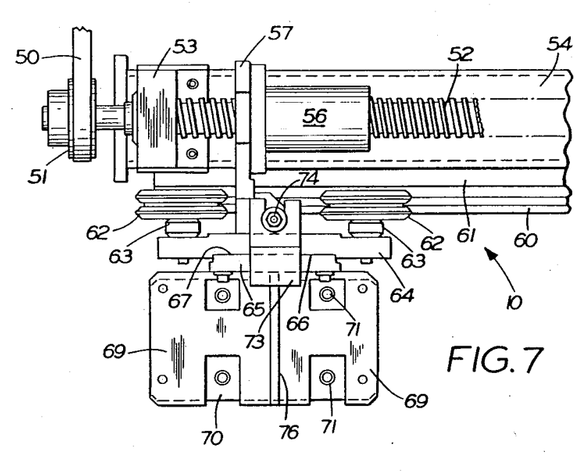
FIG. 7 is an enlarged fragmentary view of portions of the carriage assembly and carriage mounting bracket.

Cutter assembly 11 is mounted on carriage assembly 10 for transverse movement across a length of strip 7. Carriage assembly 10 includes a DC drive motor 46 mounted on an upper horizontal frame member 47 by an I-beam 48. A timing pulley 49 mounted on the output shaft of drive motor 46 is connected by a timing belt 50 to another timing pulley 51 mounted on the end of a ball screw 52 (FIGS. 1 and 7). One end of ball screw 52 is rotatably mounted in a bearing 53 adjacent pulley 51 which is supported on a rectangular-shaped screw and cutter support member 54 which extends transversely across the apparatus. A ball nut 56 is mounted in a usual manner on ball screw 52 and is secured to a carriage mounting bracket 57. The other end of ball screw 52 is mounted by a pillow bearing 59 supported on the other end of support channel 54.

Figures 11, 12:
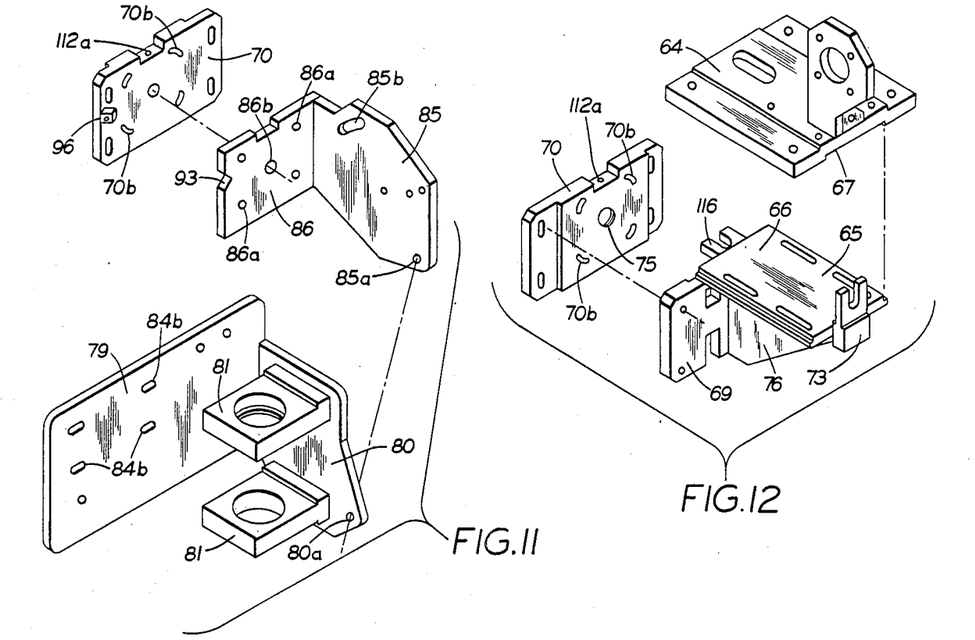
FIG. 11 is an exploded perspective view of the adjustment and mounting brackets for the cutter blade assembly.
FIG. 12 is an exploded perspective view of the adjustment and mounting brackets for the carriage assembly.
Figure 13:
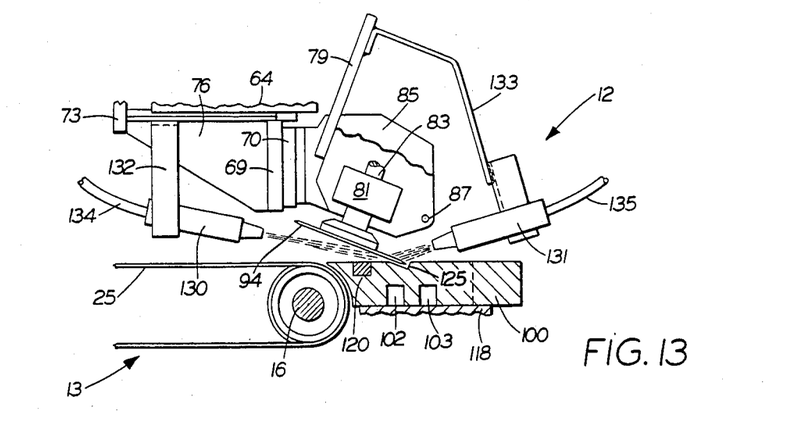
FIG. 13 is a fragmentary diagrammatic elevational view with portions in section showing the lubricant spray nozzles in relationship with the rotary cutter blade.

The carriage assembly further includes (FIG. 6) a pair of outwardly extending V-tracks 60 mounted on the bottom of a support plate 61. V-track 60 are engaged in a pair of V-guides 62 which are rotatably mounted by bushings 63 on a carriage base 64 which is slidably mounted on the top of a horizontal carriage plate 65 by bolts 58. Referring to FIG. 12, carriage base 64 includes a bottom track 67 for slidably mounting base 64 on an upper stepped surface 66 of plate 65 which includes a vertical mounting plate 69 bolted to another vertical mounting plate 70 by bolts 71. A stirup bracket 73 extends upwardly from plate 65 and has an adjusting screw 74 (FIG. 6) movably mounted therein which engages base 64 for horizontally adjusting base 64 for achieving a proper horizontal adjustment of a cutter blade 94 with respect to cut or slot 125 (FIG. 15) along which strip 7 will be severed. A diagonally extending reinforcing plate 76 extends between plate 65 and vertical plate 69 (FIGS. 6 and 12) to provide a rigid carriage assembly for the mounting of cutter assembly 11 thereon as described more fully below.

Figures 6, 9, 10:
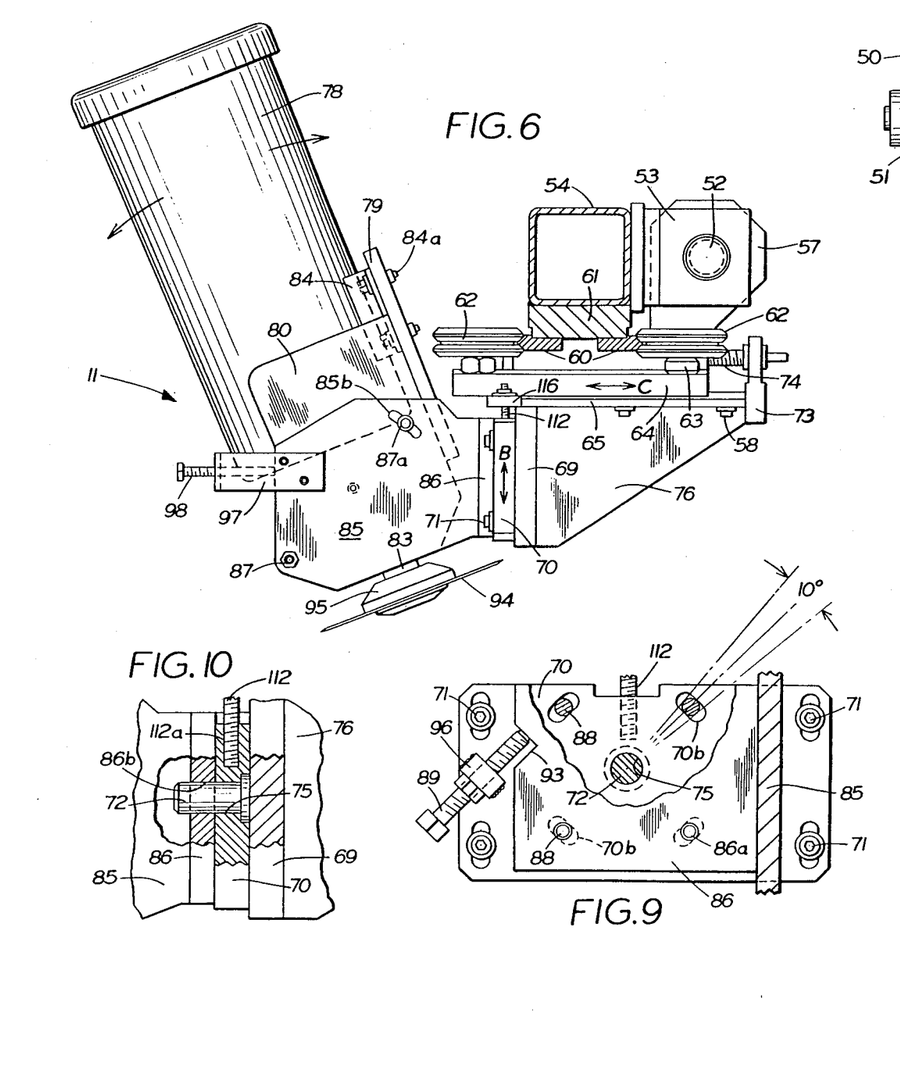
FIG. 6 is an enlarged fragmentary view with portions in section of the carriage and cutter assemblies.
FIG. 9 is an enlarged fragmentary sectional view showing the rake angle adjustment mechanism for the cutter blade drive motor.
FIG. 10 is an enlarged fragmentary view with portions broken away and in section showing details of the vertical adjustment mechanism for the cutter blade.
Figure 8:
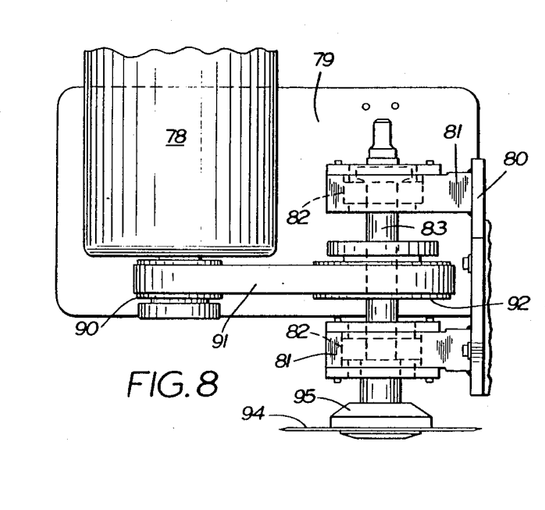
FIG. 8 is an enlarged fragmentary view showing the cutter blade and mounting of the drive mechanism therefor.

Cutter assembly 11 includes a cutter drive motor 78 which is rigidly mounted on a motor mounting plate 79 by a bracket 84 and bolts 84A which extend through holes 84B formed in plate 79 (FIGS. 6, 8 and 11). A right angle bearing support plate 80 extends outwardly from plate 79 and contains a pair of spaced bearing mounts 81 and a pair of bearings 82 for rotatably supporting a cutter shaft 83 (FIG. 8). Support plate 80 is pivotally mounted on a support plate 85 which has a right angle mounting plate 86 attached thereto (FIG. 11), by a pivot bolt 87 (FIG. 6) which extends through aligned holes 80A and 85A formed in plates 80 and 85, respectively, to provide bevel angle adjustment for the cutter blade.

Plate 86 is movably mounted on plate 70 by a plurality of bolts 88 (FIG. 9) which extend through arcuate shaped slots 70B formed in plate 70 and through aligned holes 86A formed in plate 86 (FIG. 11). Plates 86 and 70 are pivotally mounted on a pivot pin 72 (FIGS. 9, 10, 11 and 12) which is attached to plate 69 and projects through aligned holes 75 and 86B formed in plates 70 and 86, respectively. A rake angle adjustment bolt 89 is movably mounted in a nut 96 which is welded on plate 70. Bolt 89 is engaged in a cutout 93 formed in plate 86 whereby rotation of bolt 89 will pivot plate 86 on its mounting bolts 88 to provide a limited rake angle adjustment for the cutter blade.

A vertical adjustment bolt 112 is movably mounted in a tang 116 formed on plate 65 and is engaged in a threaded hole 112A which extends into vertical plate 70 (FIGS. 6, 9, 10 and 12). Movement of bolt 112 will move plate 70 and attached plates 86 and 79 vertically, as shown by arrow B of FIG. 6, to provide vertical adjustment for cutter blade 94 with respect to blade slot 125. In order to vertically adjust plates 70 and 79, bolts 71 as shown in FIG. 9 are loosened until the desired vertical position has been reached and then subsequently tightened.

Cutter assembly 11 further includes a timing pulley 90 mounted on the output shaft of cutter drive motor 78 and is connected by a timing belt 91 to another timing pulley 92 mounted on cutter shaft 83 (FIG. 8) for rotating shaft 83. Cutter blade 94 is mounted on the outer end of shaft 83 by an arbor 95.

Figure 15:
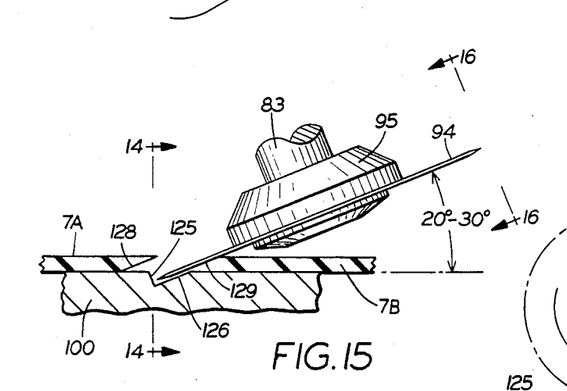
FIG. 15 is a fragmentary view with the hold-down platen shown in section looking in the direction of arrows 15—15, FIG. 14 showing the bevel angle of the cutter blade with a portion of the deformable strip being incorporated therein.

Cutter blade 94 cuts strip 7 on a predetermined bevel angle as shown in FIG. 15, regulated by a bevel angle adjustment mechanism. A bracket 97 is mounted on angle support plate 85 (FIG. 6) and has a threaded bolt 98 which engages an edge of plate 80. Movement of bolt 98 will set the bevel angle of cutting blade 94 by pivotally moving motor mounting plate 79 on pivot bolt 87. A bolt 87A attached to plate 80 extends through a slot 85B formed in plate 85 to secure the plate in a desired bevel angle position.

Figure 16:
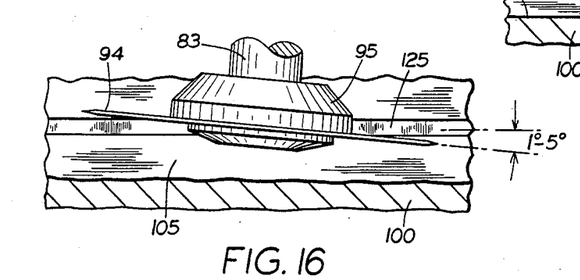
FIG. 16 is a fragmentary view with portions in section looking the direction of arrows 16—16, FIG. 15 showing the rake angle of the cutter blade with the strip material removed.

The various mounting brackets and slide mechanisms shown particularly in FIGS. 6 through 12 provide for the vertical and horizontal adjustment of cutter blade 94 as shown by arrows B and C in FIG. 6, in addition to providing a predetermined rake angle as shown in FIG. 16 and a bevel angle as shown in FIG. 15 for the blade.

Figure 3:
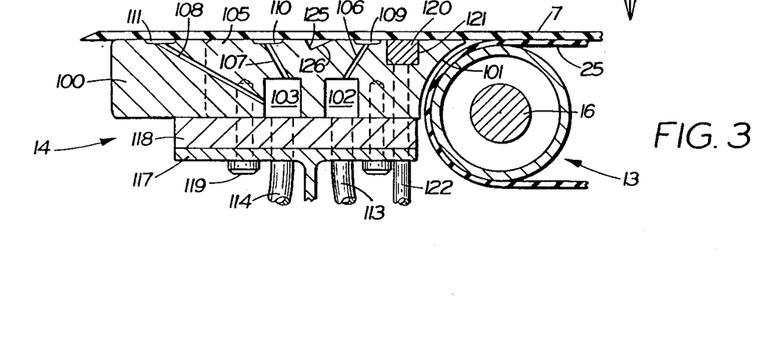
FIG. 3 is an enlarged fragmentary sectional view taken on line 3—3, FIG. 2 with a strip of deformable material being incorporated therein.

Hold-down platen and cutter plate assembly 14 is shown particularly in FIGS. 1, 2 and 3 and includes a horizontally extending platen 100 formed with an inner curved end 101 matching the general contour of internal conveyor assembly 13. Platen 100 is formed with two chambers 102 and 103 which extend transversely across the platen with respect to the direction of travel of a moving strip of deformable material as shown by arrow D in FIG. 2. Chambers 102 and 103 communicate with a plurality of elongated slots 109 and 110–111, respectively, formed in top surface 105 of platen 100 by a plurality of passages 106, 107 and 108. Chambers 102 and 103 are connected by hoses 113 and 114, respectively, to a source of pressurized air or a source of vacuum (not shown) the purposes of which are described in greater detail below.

Platen 100 is supported on inner horizontal support beam 5 by an I-beam 117 and a backing plate 118 by bolts 119 (FIGS. 1 and 3). A transversely extending pickup bar 120 is movably mounted in a complementary shaped slot 121 extending transversely across platen 100. Bar 120 is connected to a pusher shaft 122 (FIG. 3) which is moved vertically by a pneumatic cylinder 123 (FIG. 1) that is mounted on a lower leg of I-beam 117. A blade slot 125 is formed in the top surface of platen 100 and extends transversely thereacross and has a sloped wall 126 preferably coinciding with the bevel angle of cutter blade 94 (FIG. 15). The function of these various chambers, slots and pusher bar are described in greater detail below.

Lubricant spray and blow-off assemblies 12 and 15 are shown particularly in FIGS. 1, 2, 5 and 13. Spray assembly 12 includes a pair of spray nozzles 130 and 131 mounted by brackets 132 and 133, respectively, which are attached to carriage assembly 10 so as to move transversely with cutter blade 94 across material strip 7 during the cutting operation. The spray nozzles preferably are atomizing type nozzles with an orifice preferably between 0.001 and 0.030 inches and are connected to a source of pressurized lubricant (not shown) by supply hoses 134 and 135. The preferred lubricant is an alcohol such as isopropyl, and is applied with a pressure of between 5 and 60 psi. The lubricant may be of various other compositions such as water, and will provide the desired cooling and friction reduction for the cutter blade without contaminating the beveled cut edges of the severed strip.

Nozzles 130 and 131 are positioned with respect to cutter blade 94 whereby spray nozzle 131 sprays lubricant on the top side of blade 94 (FIG. 13) with nozzle 130 spraying the lubricant to the backside of blade 94. The lubricant is applied to the rotary blade at a point just above the position where the rotary blade enters the strip material to make the cut. The blade then carries the lubricant into the cut providing the necessary antifriction action to prevent smearing of the compounds in the strip.

Figure 14:
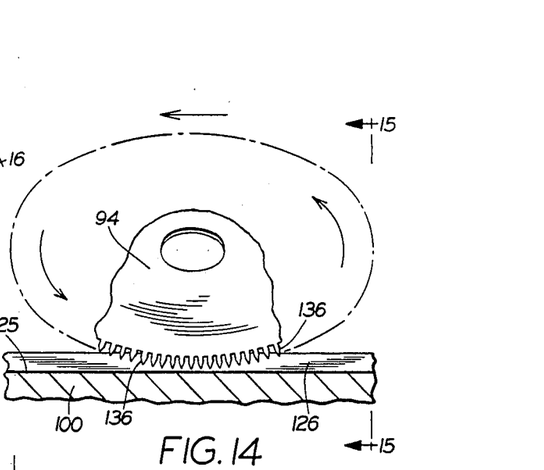
FIG. 14 is a fragmentary view with portions in section taken on line 14—14, FIG. 15.

It has been determined that a serrated blade edge as shown in FIG. 14, that is, a blade not having a solid cutting edge but one provided with a plurality of teeth 136, provides the best cutting action where minimal component contamination and a smooth and fast cut are desired. These multiple teeth allow the lubricant to surround the individual teeth improving their efficiency and cooling. During the cut cycle (arrow E, FIG. 2), the rotary blade is actuated for cutting the strip and is deactuated on the opposite return cycle. Also, the lubricant preferably is applied or actuated during the cut cycle and deactuated during the return cycle. Actuation and deactuation of the lubricant application may be modified to occur later or earlier in refernce to the rotary blade depending on observable cut quality versus excess lubricant remaining on the material after the cut.

Some excess lubricant normally will result on the blade and surrounding strip material and in order to eliminate this, blow-off assembly 15 is utilized. A plurality of blow-off nozzles 140 are actuated during the cut cycle to break up large globules of lubricant and direct them away from the cut and to blow off the beveled edge of the strip at the end of the cut cycle. Any remaining excess lubricant is similarly broken up and directed off the strip by a plurality of return blow-off nozzles 141 which are actuated on the return cycle. Thus the cut material is manipulated prior to the return cycle to insure excess lubrication blow off from the severed ends and to allow clearance for the cutter blade which is not rotating during its return cycle.

Figure 5:
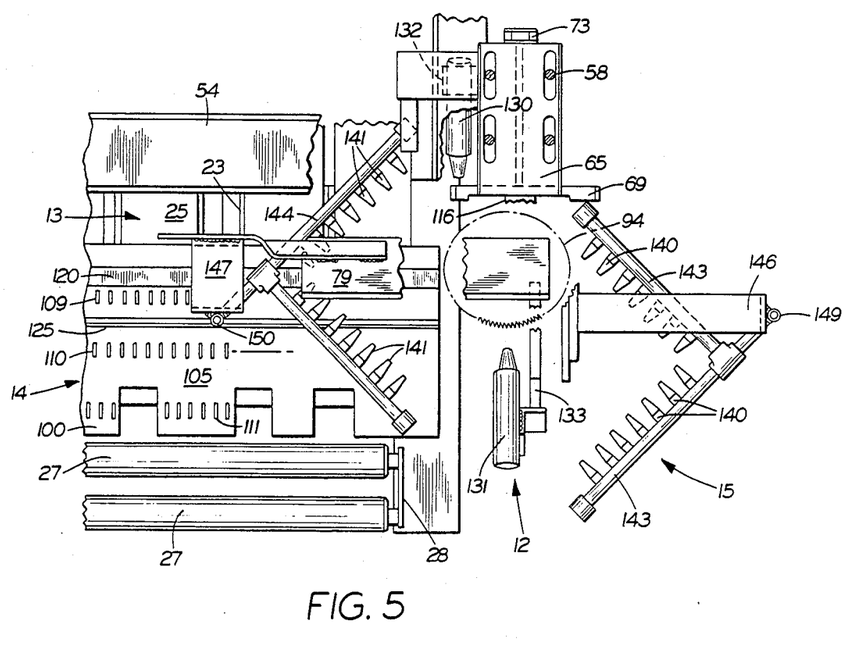
FIG. 5 is an enlarged fragmentary view with portions broken away showing the lubricant spray nozzles and blow-off nozzles of the improved apparatus.

Blow-off nozzles 140 and 141 are mounted on fluid delivery pipes 143 and 144 which are supported on the ends of brackets 146 and 147 (FIGS. 2 and 5). The brackets are mounted on carriage assembly 10 so that the nozzles are movable with the carriage assembly during the cut and return cycles. The delivery pipes are connected to a source of pressurized air or fluid by lines 149 and 150, respectively.

A modified device for applying lubricant on cutter blade 94 is indicated generally at 152, and is shown in FIGS. 17–20. Device 152 includes a pair of absorbent felt pads 153 and 154 which are mounted on one end of a pair of brackets 155 and 156, respectively. These brackets are mounted on a support bracket 157 which is secured to carriage assembly 10 by a mounting plate 158 and bolts 159. Pad mounting brackets 155 and 156 are pivotally mounted on bolts 160 which are positioned within an elongated slot 161. The other ends of the pad mounting brackets are biased apart by a compression coil spring 163 which moves the felt pads inwardly toward each other. The felt pads preferably will be mounted in seats 164 formed in the ends of brackets 155 and 156 by an adhesive or other securing means. A connector 165 is mounted on each bracket end and communicates with pads 153 and 154 for supplying a lubricant to the pads through supply hoses 166.

Figures 17, 18, 19:
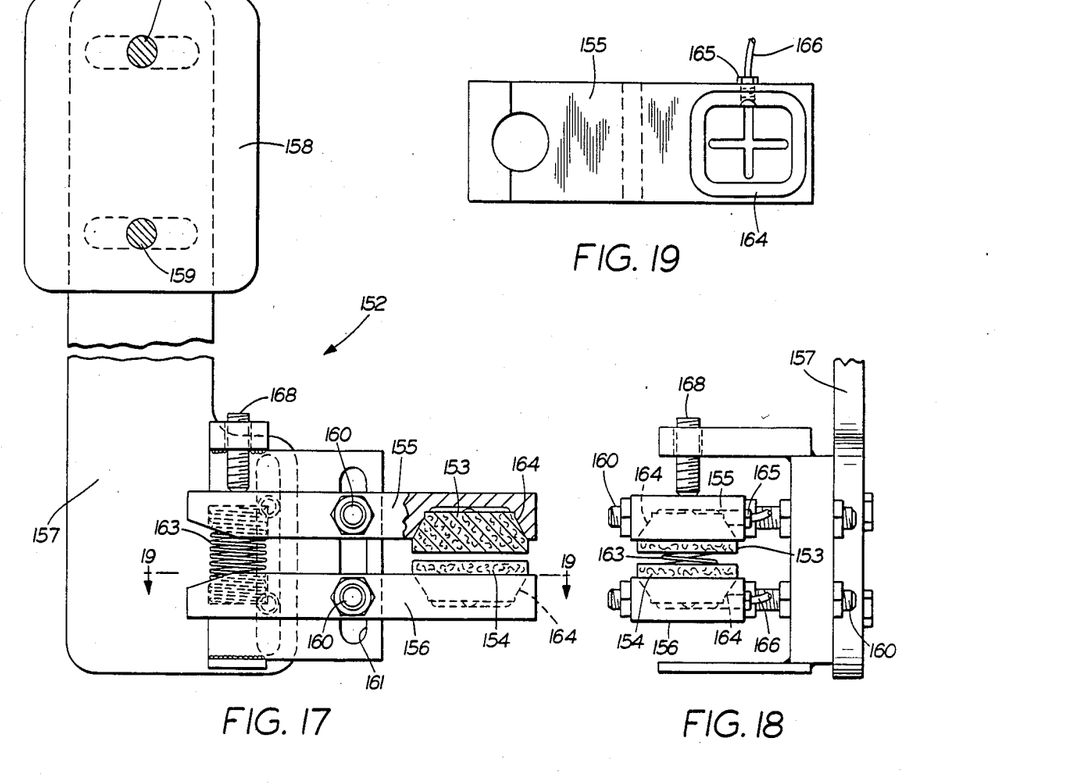
FIG. 17 is an elevational view with portions broken away and in section, showing a modified device for applying lubricant to the cutter blade.
FIG. 18 is a fragmentary end elevational view of the lubricant applying mechanism of FIG. 17.
FIG. 19 is a fragmentary sectional view taken on line 19—19, FIG. 17.

The tension applied by spring 163 is adjustable by means of a bolt 168.

Figure 20:
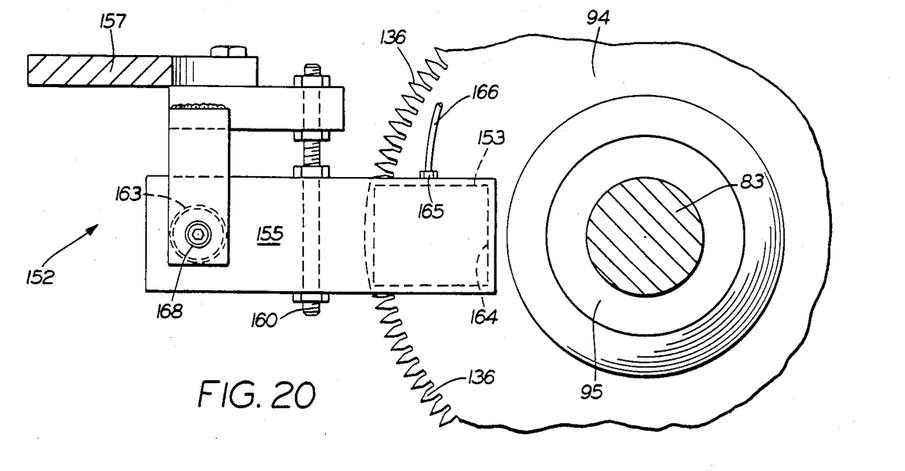
FIG. 20 is a fragmentary plan view showing the mechanism of FIGS. 17-19 applying lubricant to the cutter blade.

Modified lubricant application device 152 provides for the application of a lubricant on the rotating blade as shown in FIG. 20 wherein the felt pads will wipe across the rotating blade as it cuts into strip 7 applying lubricant to the blade and strip cut. Generally device 132 will reduce the excess lubricant which results when spray nozzles 130 and 131 are utilized as discussed above.

However, blow-off assemblies 140 and 141 will normally be utilized with device 152 to remove any excess lubricant which may occur and to insure a clean contamination free cut on the strip of material.

The operation of improved apparatus 1 and the carrying out of the steps of the improved method of the invention is set forth below. A strip 7 of deformable material, for example a strip of material to be used in the manufacturing of a tire body and/or tread thereof, is moved automatically on incoming conveyor belt 8 as shown in FIG. 1 and onto internal conveyor assembly 13. Strip 7 is maintained in contact with conveyor belts 25 by hold-down rolls 30 with tensioning rolls 26 maintaining the desired tension on the conveyor belts. The speed of conveyor belts 25 is coordinated and regulated by the use of timing belts 39 and 44 and motor drive reducer 35.

Carriage assembly 12 will be in the position as shown in FIG. 2, which is the start of the cut cycle, upon the inward movement of strip 7. A pair of mechanical gripping fingers 169, of the type well known in the art, will grasp the front end of the moving strip and pull it in the direction of arrow E (FIG. 1) until the desired length of strip material extends beyond the blade slot or cut line 125. If desired strip 7 can be moved by a usual flat conveyor or other transporting means. The appropriate automatic controls (not shown) are actuated causing the ball screw drive motor 46 to rotate the ball screw moving carriage assembly 10, cutter assembly 11, lubricant spray assembly 12, and blow-off assembly 15 transversely along support beam 54. Cutter blade 94 is rotated by motor 78 having been preset to the desired horizontal and vertical position by the various slide and mounting plates as shown particularly in FIGS. 11 and 12 and described above. Also blade 94 is at the desired bevel angle by the pivotal movement of the blade by means of adjusting bolt 98 and at the desired rake angle by movement of adjustment bolt 89 (FIGS. 6 and 9).

Immediately before the start of the cut angle and transverse movement of the carriage assembly along the cut line, a vacuum is applied to platen chambers 102 and 103 which will firmly draw strip 7 downwardly against the platen due to the vacuum being applied to the underside surface of the strip through the series of elongated slots 109, 110 and 111. In particular, the strip is pressed firmly down against the platen at locations on opposite side of the cut line by vacuum slots 109 and 110 (FIGS. 2 and 3). This fully supports and retains the strip in a firm position on the supporting surface of platen 100 allowing a precise bevel cut across the full width of the material, particularly when the strip material consists of varying light gauge components. The applied vacuum assures nonslippage of the strip during the cut and seals the bottom surface of the strip against lubrication contamination. As shown particularly in FIG. 13, atomizing spray nozzles 130 and 131 are positioned whereby nozzle 131 will spray a lubricant on the top side of the rotary blade with nozzle 130 spraying the lubricant on the back side of the rotary blade. The lubricant is applied onto the rotary blade at a point just above the position where the rotary blade enters the material to make the cut. The blade then carries the lubricant into the cut providing the necessary antifriction action to prevent smearing of the strip compounds. The multi-tooth or serrated cutting edge of blade 94 further enhances this by allowing the lubricant to surround the individual blade teeth 136 upon entering the strip.

It has been determined that to achieve the most satisfactory cut, blade 94 is at a bevel angle of between 20° to 30° to the horizontal as shown in FIG. 15 and moves transversely across the strip at a rake angle of between 1° and 5° as shown in FIG. 16. The rake angle provides for a satisfactory beveled edge 128 on the trailing edge of the sized strip 7A and the front or leading edge 129 of the incoming strip 7B as shown particularly in FIG. 15.

These two accurately angled beveled edges which are relatively contamination free permit the joining thereof when sized strip 7A is placed on a tire building drum or other apparatus.

The lubricant will normally be applied by nozzles 130 and 131 throughout the majority of the cut cycle resulting in some excess lubrication., Actuation and deactuation of the lubricant application may be modified to occur later or earlier in reference to the contact of the rotary blade with the strip depending upon observable cut quality versus excess lubrication remaining on the material after the cut. In order to eliminate any such excess lubrication, blow-off assembly nozzles 140 are actuated during the cut cycle whereby the pressurized fluid emitted therefrom, which generally will be air, will break up large globules of lubricant and direct them away from the cut. Nozzles 141 are actuated during the return cycle and will subsequently blow off any remaining globules off the material after the cut cycle to clean the cut beveled edges. After the cut has been made, that is, when the carriage and various assemblies carried thereby reach the left hand end of the carriage support beam (FIG. 2), the vaccum applied to chambers 102 and 103 is removed and air is introduced into the chambers simultaneously with the actuation of pneumatic cylinder 123 raising pusher bar 120 upwardly to assist in the release of the strip from the vacuum hold-down platen. The air also flows through passage 108 and out through the forwardmost series of slots 111 to further assist in releasing the hold-down force of the vacuum on the strip against the platen surface.

Gripper fingers 169 or other transport means will then pull the severed accurately sized strip 7A off of the platen and over roll 27 onto a discharge conveyor (not shown) where it is released to another work station or storage area. The gripper fingers then advance forward and in combination with the movement of conveyor belts 8 and 25, will advance strip 7 until the leading beveled end 129 thereof extends the desired length beyond the cut line for subsequent hold-down of the strip by the platen vacuum.

Prior to this advancement of another strip section pass the cut line, the rotation of the cutter blade is deenergized and the rotation of the ball screw is reversed returning the carriage assembly and supported assemblies back to its initial start position. During this return cycle, blow-off nozzles 141 preferably are actuated which will blow-off and remove any excess lubricant or other contamination caused by the just completed cutting action of the blade from the beveled edge of the strip to provide a relatively clean and contamination free front beveled edge.

The control mechanism for stopping and starting the movement of the various conveyors, drive motors, spray nozzles, and blow-off nozzles are components and systems readily commercially available and known to them skilled in the art and therefore need not be discussed in detail. Likewise, the coordination of the control components may be monitored and controlled by a computer or other programmable automatic various control equipment to provide for completely automated strip forming.

It has been determined that to achieve the most satisfactory cut, the coordination of a number of the method steps and apparatus parameters discussed above is desirable. The blade preferably has an outside diameter of between 3¾ inches and 5 inches and a thickness of between 0.06 inches and 0.12 inches, and has a serrated outer edge formed by a plurality of individual teeth in contrast to a smooth continuous cutting edge. For a blade having the particular diameter and thickness set forth above it has been found that between 96 and 132 teeth provide the most satisfactory cut. Also, a bevel of between 20° and 30° to the horizontal with a rake angle of between 1° and 5° is believed to provide the most satisfactory cut. Furthermore, blade 94 is rotated in the range of 500 to 1500 rpm and has a traversing speed of between 4 and 16 inches per second.

A vacuum hold-down of between 10 and 17 inches of mercury is preferred for securely gripping and retaining the strip on opposite sides of the cut line during the cutting operation. The spray nozzles preferably have an orifice of between 0.01 and 0.03 inches with an atomizing spray of between 5 and 60 psi for applying the lubricant. The blow-off nozzles preferably have a fluid pressure of between 1 and 10 psi.

The quality of the cutting action is further enhanced by rotation of the blade into the material from the top and the mounting of the blade to cut a shallow bevel together with the rake or angled movement of the blade into the cut during its transverse movement across the material. These features when combined with the parameters discussed above and the vacuum hold-down of the strip and the sealing of its bottom surface provides for a relatively distortion and contamination free beveled cut.

Accordingly, the improved apparatus and method of the invention is simplified, provides an effective, safe, inexpensive, and efficient devices and method which achieves all of the enumerated objectives, provides for eliminating difficulties encountered with prior devices and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved method and apparatus for transversely cutting strips of deformable material is constructed and used, the characteristics of the construction, and the advantageous, new and useful results obtained; the new and useful structures, devices, elements, arrangements, parts, and combinations and steps of the method are set forth in the appended claims.

What is claimed is:

1. An improved method for transversely cutting a strip of deformable multi-component material including the steps of:
    (a) transporting an elongated strip of said material along a support structure to a stationary position at a cutting station;
    (b) firmly drawing the stationary strip against the support structure at two spaced apart positions;
    (c) moving a rotating cutter blade in a cutting direction generally transversely across the stationary strip between the spaced positions to cut the strip along a cut line and provide a sized cut strip during a cut cycle;
    (d) applying a lubricant on the blade as it is moving across the strip in the cutting direction;
    (e) removing by a fluid pressure stream some of the lubricant after it has been applied onto the blade and transferred to the strip during the cut cycle;
    (f) moving the cutter blade in a direction opposite to the cutting direction during a return cycle after completion of the cut cycle at the cutting station;
    (g) removing by a fluid pressure stream some of the transferred lubricant from the strip during the return cycle at the cutting station;
    (h) releasing the cut strip and the remaining elongated strip from against the support structure at both positions; and
    (i) removing the sized cut strip from the support structure.

2. The method defined in claim 1 including rotating the blade during the cutting of the strip at a rotational speed of between 500 and 1500 rpm.

3. The method defined in claim 2 including moving the rotating blade in the transverse direction during the cutting of the strip at a speed of between 4 and 16 inches per second.

4. The method defined in claim 1 including applying the lubricant on the blade by a pressurized atomizing spray.

5. The method defined in claim 4 including spraying the lubricant on the blade at a pressure of between 5 and 60 psi.

6. The method defined in claim 4 including spraying the lubricant onto the cutter blade at a position just forward of the location when the blade cuts into the strip.

7. The method defined in claim 1 including stopping the rotation of the blade during the return cycle transversely back to a starting position for another cut cycle.

8. The method defined in claim 1 including applying the fluid stream during the cut and return cycles at a pressure of between 1 and 10 psi.

9. The method defined in claim 1 including adjustably mounting the cutter blade on a carriage and moving the carriage transversely across the strip by a ball screw drive mechanism.

10. The method defined in claim 1 including positioning the cutter blade with respect to the strip to provide a bevel cut angle of between 20° and 30° to the horizontal.

11. The method defined in claim 1 including positioning the cutter blade to provide a rake angle of between 1° and 5° during the transverse movement of the blade during the cut cycle.

12. The method defined in claim 1 including forming a vacuum beneath the strip for drawing said strip against the support structure.

13. The method defined in claim 12 including removing the vacuum applied to the strip and mechanically pushing upwardly on the strip to release the strip from the support structure after the cut cycle.

14. The method defined in claim 1 including providing a serrated cutting edge on the cutter blade.

15. The method defined in claim 14 including forming the serrated cutting blade edge by a plurality of teeth, in the range of 96 to 132 teeth.

16. The method defined in claim 1 including removing the sized cut strip from the support structure and then moving the remaining elongated strip a distance beyond the cut line generally equal to the sized cut strip.

17. The method defined in claim 1 including applying the lubricant on the blade by pressurized contact of an absorbent material containing the lubricant against the rotating blade during the cut cycle.

18. The method defined in claim 1 including providing an angled slot in the support structure beneath the cut line closely matching a bevel angle of the blade for receiving the edge of the blade during the cut cycle.

19. An improved method for transversely cutting a strip of deformable multi-component material including the steps of:
   (a) transporting an elongated strip of said material along a support structure to a stationary position at a cutting station;
   (b) firmly drawing the stationary strip against the support structure at two spaced apart positions;
   (c) providing a cutter blade having a diameter generally between 3¾ inches and 5 inches, and having a serrated cutting edge formed by a plurality of teeth generally in the range of 96 to 132 teeth;
   (d) rotating the cutter blade at a rotational speed of between 500 and 1500 rpm;
   (e) moving the rotating cutter blade in a cutting direction generally transversely across the stationary strip between the spaced positions at a speed of between 4 and 16 inches per second to cut the strip along a cut line and provide a sized cut strip during a cut cycle;
   (f) applying a lubricant on the blade as it is moving across the strip in the cutting direction;
   (g) removing some of the lubricant after it has been applied onto the blade;
   (h) releasing the cut strip and the remaining elongated strip from against the support structure at both positions; and
   (i) removing the sized cut strip from the support structure.

20. A device for transversely cutting a strip of deformable material including:
   (a) support means for supporting a strip of said material;
   (b) transport means for moving said strip along the support means;
   (c) a cutter blade movably mounted for a generally transverse movement across said strip along a cut line during a cut cycle;
   (d) drive means for moving the cutter blade generally transversely across the strip in a cutting direction during the cut cycle and for moving the cutter blade in an opposite return direction during a return cycle;
   (e) means for rotating the blade;
   (f) hold-down means for holding the strip against the support means on opposite sides of the cut line during the cut cycle;
   (g) means for applying a lubricant onto the blade generally throughout its cutting movement across said strip; and
   (h) blow-off means for directing excess lubricant away from the cut line, said blow-off means including at least two fluid nozzles for directing streams of a pressurized fluid toward the cutter blade with one of said nozzles being actuated during the cut cycle and the other of said nozzles being actuated during the return cycle.

21. A device for transversely cutting a strip of deformable material including:
   (a) support means for supporting a strip of said material;
   (b) transport means for moving said strip along the support means;
   (c) a cutter blade movably mounted for a generally transverse movement across said strip along a cut line during a cut cycle;
   (d) drive means for moving the cutter blade generally transversely across the strip in a cutting direction during the cut cycle and for moving the cutter blade in an opposite return direction during a return cycle;
   (e) means for rotating the blade;
   (f) hold-down means for holding the strip against the support means on opposite sides of the cut line during the cut cycle including a platen having at least two chambers, each communicating with a series of slots formed in the platen and located on opposite sides of the cut line, and a vacuum applied to the chambers and associated slots for drawing the strip against the support means during the cut cycle;
   (g) pickup means mounted on the support means for assisting the release of the strip from the hold-down means after the cut cycle, said pickup means being a fluid pressure actuated pickup bar extending transversely across the support means and vertically movable with respect thereto;
   (h) means for applying a lubricant onto the blade generally throughout its cutting movement across said strip; and
   (i) blow-off means for directing excess lubricant away from the cut line.

22. A device for transversely cutting a strip of deformable material including:
   (a) support means for supporting a strip of said material;
   (b) transport means for moving said strip along the support means;
   (c) a cutter blade movably mounted for a generally transverse movement across said strip along a cut line during a cut cycle;
   (d) drive means for moving the cutter blade generally transversely across the strip in a cutting direction during the cut cycle and for moving the cutter blade in an opposite return direction during a return cycle;
   (e) means for rotating the blade;
   (f) vacuum hold-down means for holding the strip against the support means on opposite sides of the cut line during the cut cycle;
   (g) means for applying a lubricant onto the blade generally throughout its cutting movement across said strip;
   (h) blow-off means for directing excess lubricant away from the cut line during both the cut cycle and the return cycle; and
   (i) pickup bar means extending transversely across the support means and movable vertically with respect thereto for assisting the release of the strip from the vacuum hold-down means after the cut cycle.

23. The device defined in claim 22 in which the blade is at a bevel angle between 20° and 30° with respect to the horizontal as it moves along the cut line to cut the strip during the cut cycle.

24. The device defined in claim 23 in which the blade is at a rake angle of between 1° and 5° as it cuts the strip during the cut cycle.

25. The device defined in claim 22 in which the blade has an outer diameter of between 3¾" and 5"; a thickness of between 0.06" and 0.12", and between 96 and 132 teeth along its circumference.

26. The device defined in claim 25 in which the blade rotates at a speed of between 500 and 1500 rpm as it cut the strip during the cut cycle.

27. The device defined in claim 26 in which the blade moves transversely across the strip at a speed of between 4 and 16 inches per second during the cut cycle.

28. The device defined in claim 22 in which the lubricant is comprised mainly of alcohol.

29. The device defined in claim 22 in which the blade is mounted above the strip of material and cuts into the strip from above as it moves along the cut line.

30. The device defined in claim 22 in which slot means is formed in the support means and matches a bevel angle of the blade for providing a precise cut bevel across the strip.

31. The device defined in claim 22 in which the means for applying the lubricant is at least two atomizing spray nozzles; and in which one of the nozzles sprays lubricant on a top side of the blade and the other of said nozzles sprays lubricant on a back side of said blade during the cut cycle.

32. The device defined in claim 22 in which the means for applying the lubricant is at least one pad of absorbent material containing the lubricant in sliding contact with the rotating blade during the cut cycle.

33. The device defined in claim 22 in which the blade rotating means is actuated during the cycle and is deactuated during the return cycle.

34. The device defined in claim 22 in which the blow-off means includes at least two fluid nozzles for directing streams of a pressurized fluid toward the cutter blade; and in which one of said nozzles is actuated during the cut cycle and the other of said nozzles is actuated during the return cycle.

35. The device defined in claim 22 in which the hold-down means includes a platen having at least two chambers, each communicating with a series of slots formed in the platen and located on opposite sides of the cut lines; and in which a vacuum is applied to the chambers and associated slots for drawing the strip against the support means during the cut cycle.

36. The device defined in claim 22 in which the pickup bar means is a pneumatically actuated pickup bar.

37. The device defined in claim 22 in which the transport means includes an input conveyor for moving said strip toward the cut line and grippers for moving a forward edge of the strip a predetermined position beyond the cut line.

38. The device defined in claim 22 in which the drive means includes a carriage movably mounted on a guide track and a ball screw mechanism for moving said carriage along the guide track.

39. The device defined in claim 38 in which the cutter blade and means for rotating said blade are mounted on the carriage.

40. The device defined in claim 39 including means for adjusting the horizontal, vertical, rake and bevel positions of the cutter blade with respect to the strip.

41. The device defined in claim 40 in which the means for rotating the cutter blade is an electric motor; in which the blade adjustment means includes a mounting bracket supporting the blade drive motor, said bracket being pivotally mounted on a second bracket which is rotationally and vertically adjustably mounted on a third bracket; and in which said third bracket is horizontally adjustably mounted on the carriage.

* * * * *